Patented Mar. 1, 1932

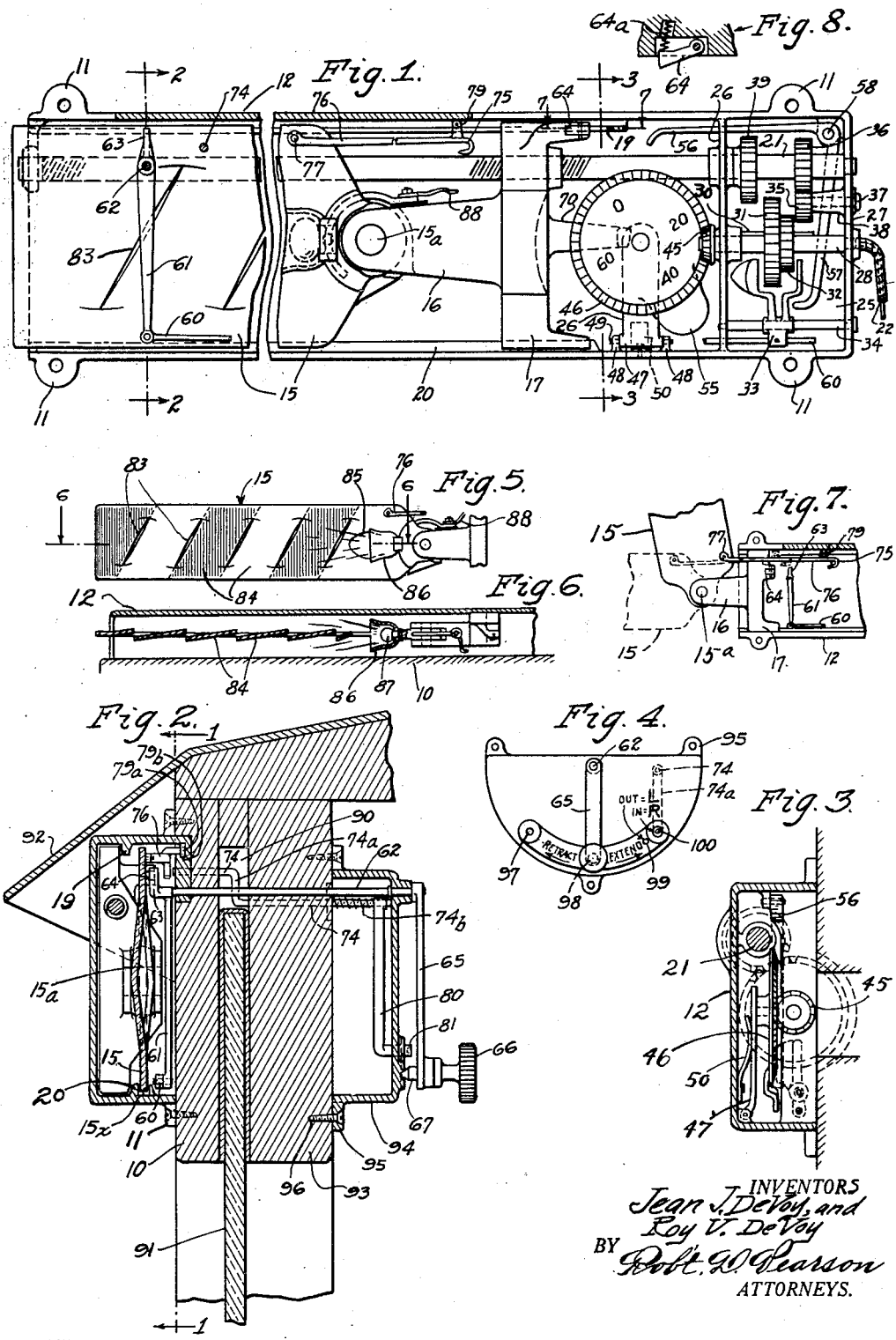
March 1, 1932. J. J. DE VOY ET AL 1,847,474
MECHANICAL SIGNAL DEVICE
Filed Jan. 28, 1931
INVENTORS
Jean J. DeVoy, and
Roy V. DeVoy
BY Robt. W. Pearson
ATTORNEYS.

1,847,474

UNITED STATES PATENT OFFICE

JEAN J. DE VOY, OF COMPTON, AND ROY V. DE VOY, OF LOS ANGELES, CALIFORNIA

MECHANICAL SIGNAL DEVICE

Application filed January 28, 1931. Serial No. 511,804.

This invention relates to a mechanical signal device more particularly intended for use upon self-propelled vehicles but adapted also for various other uses.

An object of the invention is to provide a signal device for use upon automobiles whereby a variety of signals indicative of change in direction or speed of the vehicle may be more efficiently displayed.

A further object of the invention is to provide improved means for combining with the steering wheel of self-propelled vehicles the necessary operative elements for controlling the signal with a minimum interference with the steering operation. This feature of the invention greatly lessens the hazard which has hitherto resulted from steering self-propelled vehicles with one hand at the time of making a signal indicative of a change in the course of the vehicle. The driver's effort to operate the signal is more quickly completed, because the signaling device, after being put into operation, completes the desired displaying of the signal without requiring more thought or attention on the part of the driver.

By this invention, as compared with signals now in general use, a signal is provided which is visible at a greater distance and is less apt to convey a wrong impression with regard to the character of signal intended.

The signal device provided by this invention is particularly valuable for use during inclement weather, as it avoids the necessity of lowering a window and raising the same after the signal has been given. In bad weather great care must be exercised in signaling by the present methods, as it is apparent that the action of opening the window, holding the arm out, and lowering the window again, requires steering the vehicle with one hand only for a considerable interval, thereby increasing the hazard caused by possible loss of control of the vehicle. Furthermore in stormy weather or in very cold weather, the driver is tempted to neglect proper signaling to avoid the discomfort of exposing his person or clothing to the outside weather to the extent required to give the signal.

Still another object of the invention is to provide a signal which, in case of an accident due to the careless observation of the signal by the driver of another vehicle, the position of the signal at the time of the accident will afford means of proof that the signal was given in a sufficient time to render the accident unnecessary had the signal been properly heeded.

Other objects, advantages and features of invention may hereinafter appear.

Referring to the accompanying drawings which illustrate what is at present deemed to be a preferred embodiment of the invention, Fig. 1 is a longitudinal section, with an intermediate portion broken away to contract the length of the view, showing the signal and its operating means within the casing provided therefor.

Fig. 2 is a cross-section of the signal proper, there being included in the view a portion of the vehicle upon which it is mounted. In this view the signal proper and its casing are sectioned on line 2—2 of Fig. 1.

Fig. 3 is a cross-section on line 3—3 of Fig. 1, the adjacent portion of the vehicle being included in the view.

Fig. 4 is a view of the indicating plate of the signal showing also the operating handle and parts which cooperate therewith.

Fig. 5 is a view of the signal proper showing the preferred form thereof and mounting means therefor.

Fig. 6 is a transverse section on line 6—6 of Fig. 5. In this view the signal proper is shown in the retracted position and the adjacent portion of the vehicle is included in the view.

Fig. 7 is a fragmental vertical section showing the outer end portion of the track or guide along which the signal proper travels.

Fig. 8 is a side elevation of the reversing pawl and its support.

Referring in detail to the drawings, the device may be mounted upon the vehicle in any suitable manner, being shown in the drawings by way of example, as attached to the wall or side portion 10 of the vehicle by means of apertured lugs 11 with which the elongated signal casing 12 is provided. Said casing is shown as an elongated housing having attaching ears 11 formed on corner portions thereof and adjacent to its open, flat side, that is to say, the side thereof which would be open if not closed by the side of the vehicle against which it abuts.

Referring in a general way to the operating parts of the device, the signal proper 15, which is shown intact in Fig. 5, but broken away in Fig. 1 to contract the view, has its inner end pivotally mounted at 15a upon a horizontal extension 16 with which the carriage 17 is provided. Said carriage 17 reciprocates within the casing 12 being guided in its movements by an upper rail 19 and a lower rail 20. Motion is transmitted to said carriage by means of the screw shaft 21 which extends lengthwise of and within the casing 12 and at its inner end is driven by means of the flexible driving shaft 22 and a reversible arrangement of gearing presently to be described.

The gearing for rotating the screw shaft 21 is located within a compartment 25 which is walled off from the remainder of the casing by the partition plate 26, said partition plate 26 cooperating with the end plate 27 of the casing to form means for rotatably supporting the counter-shaft 28 which is fixed to and forms a continuation of the flexible driving shaft 22 which is driven from the counter shaft (not shown) of the transmission gearing of the vehicle.

To said shaft 27 is slidably attached, as by means of the spline or key 30, the large driving gear 31 and small driving gear 32. The sliding movements of these gears are controlled by means of a clutch 33 which is slidably mounted upon a clutch shaft 34, said shaft 34 being supported by and between the plates 26 and 27. When said clutch is in the right hand position, with reference to Fig. 1, the small gear 32 is in mesh with an idle gear 35 which in turn meshes with a driven gear 36 which is fixed to the screw shaft 21. Said idle gear 35 is rotatably supported in any suitable manner as upon a pin 37 which is mounted upon and within a supporting sleeve or bracket 38.

When the gear 31 is moved by the clutch 33 to the left hand position, it meshes with a driven gear 39 which is fixed to the screw shaft 21. It will be seen that by providing the idle gear 35 the screw shaft 21 is caused to reverse its rotation when the clutch and gears moved thereby are shifted from the left hand to the right hand position. In Fig. 1 the clutch is shown in the neutral position wherein the gears controlled thereby are out of mesh with the idle gear and gear 39.

To the inner end of the counter shaft 28 is secured a small bevel gear 45 which is in mesh with a large bevel gear 46 which is rotatably mounted upon a standard 47, said standard 47 is pivotally supported upon and between bearing lugs 48 by means of a pin 49. Behind said standard 47 as viewed in Fig. 1, is located a leaf spring 50 which normally maintains said standard in an upright position wherein the gear 46 is in mesh with the gear 45.

The movements of the clutch 33 are controlled both manually and automatically. The gear 46 which is mounted upon the standard 47 is provided with a radially projecting cam portion 55 which at times engages the extremity of an arm 56 which forms a part of a bell-crank, the other arm 57 of which is in an operative relation to the outer side of the clutch 33. When cam element 55 comes into contact with said arm 56 it moves the arm 57 to the left and thereby shifts the clutch to the neutral position shown in Fig. 1. At the juncture of arms 56 and 57, the bell-crank which these arms form is pivotally supported upon the pin 58.

The reverse movement of the clutch 33 is effected by means of a rod 60 which is fixed to said clutch and which extends parallel to the clutch shaft 34. Near the outer end of the signal casing 12 the outer end of said rod 60 is pivotally connected with the lower end of a pendant arm 61, said arm 61 being pivotally supported near its upper end by a shaft 62 to which it is secured. A portion 63 of the rod 61 projects above said shaft 62 and is positioned to be in the path of a dog 64 which is pivotally mounted upon the upper portion of the carriage 17. This part 63 is engaged by said dog just before the signal element 15 reaches the outer limit of its travel. At times it is necessary to manually shift the clutch to the right with reference to Fig. 1. For this purpose a crank arm 65 is secured to the shaft 62 and is provided with an operating handle 66.

Means are also provided to automatically move the upright bevel gear 46 laterally out of mesh with the small gear 42. For this purpose the carriage 17 is provided on its inner side with a cam extension 70 which, when the carriage reaches the inner limit of its movement, engages the upper portion of the pivotally mounted standard 47 on the side of said standard which is next to the gear 46.

When said cam extension 70 thus engages and moves said standard, the gears 46 and 42 are separated so that the continuous rotation of the flexible driving shaft does not have any effect upon the operation of the apparatus. When the carriage 17 again starts on its outward movement, cam extension 70 is withdrawn from contact with the standard, and the spring 50 returns said standard to its upright position thus bringing the gear 46 into mesh with the gear 42.

Whenever the carriage 17 reaches the completely retracted position, and the cam extension 70 thereof engages and deflects the standard 25 from its normal position thus moving the indicating gear 46 out of mesh with the pinion gear 45, the weight of the cam element 55 carried by said gear 46 causes said gear to rotate until said weighted part 55 reaches the lowest possible position, in which position the numeral "0" will occupy the highest position wherein it will be brought opposite to the side opening. Hence at this time the gear 46 assumes its "0" position so that when the signal is started to operate by the manual means, in case an accident stops the vehicle at any time after the manual means has been adjusted, the position of the gear 46, as determined by the numerals inscribed thereon, will be a means of ascertaining whether or not the signal was executed by the driver at the proper time. In other words, owing to the fact that the gear 46 is in a positively driven relation to the running gear of the vehicle during the operation of the signal, the indicating numbers on the gear 46 will tell how far the vehicle travelled from the time the signal was put into operation until the accident occurred.

To provide for manually causing the signal element 15 to assume an upwardly inclined position when it is fully ejected for the purpose of indicating a left hand turn, a slightly slidable horizontal shaft 74 is mounted a little below the upper side of the signal casing and is so positioned that the sliding movements of said shaft will bring one end thereof into and out of engagement with the hooked end 75 of an arm 76 which is pivotally secured at 77 to the signal element 15 near its inner end, the outer portion of said arm 76 having an extension 79 which carries a roller 79a (see Fig. 2) that travels along a groove 79b, thus supporting in an anti-frictional manner the hooked portion of the arm 76 during the travel thereof. Returning to the rod 74, to the outer end portion thereof is secured a downwardly extending arm 80 having at its lower end an outwardly directed portion 81. The inner end portion of the rod 74 is offset upwardly at 74a in order to bring the inner end of said rod into the path of the hook 75. The inner end portion as well as the outer portion of said rod is guided in its movement by the part of the vehicle wall through which it extends. A compression spring 74b coiled around said rod normally keeps its inner end out of the path of the hook 75.

The crank arm 65 consists of a blade of metal which is sufficiently resilient to permit the outer end thereof to be deflected slightly from the normal position, this construction makes it possible to bring the pointed pin 67 of the handle 66 into register with the outwardly directed portion 81 of the arm 80 and then depress said arm 80 and thereby shift the rod 74 to bring the outer end thereof into the path of the hook 75 (see Fig. 1), thus to cause the signal element 15 to swing upwardly when it is projected for the purpose of indicating a right hand turn.

From the viewpoint of the operation the hook portion 75 of the arm 76 constitutes a shoulder in spaced relation to the pivotal mounting of the signal element 15, said shoulder engaging a stop interposed in its path to change the position of the signal element when the same is ejected to indicate a left hand turn.

It is desirable to provide means to indicate the extent of rotation of the gear 46 from its normal position at a given time. For this purpose said gear has inscribed upon the face thereof nearest to the operator a series of rotation-indicating numbers, the numbers "0", "20", "40" and "60" being shown in Fig. 1 of the drawings. Through the side of the casing nearest to the operator is provided a side opening large enough to show plainly any of these numbers, said side opening being located in the path along which these numbers travel as the gear 46 rotates.

In order to render the signal element 15 more clearly visible at night, the elongated metal plate by which said signal element is formed is provided with a series of transversely extending slits 83 which are cut somewhat on the bias, each end of each of said slits terminating at a distance from the side edge of the plate. The portion of the plate which intervenes between adjacent slits is tarved out of the plane of the plate thus forming a series of blades 84 as shown in section in Fig. 6. The object of this construction is to reduce the wind pressure against the signal element when it is in the extended position.

Near its inner end the signal plate 15 has an oval opening 85 cut therethrough at its mid-width, the long axis of said opening extending lengthwise of the plate. The right hand portion of this opening 85 as viewed in Fig. 5 is occupied by a bell-shaped reflector 86 within which is located an electric lamp 87. This lamp is positioned to direct light across the slitted portion of the signal. Said lamp 87 is supplied with current from a properly insulated wire 88 which is provided with the requisite amount of slack to prevent interference with the operation of the signal and which is conducted from the casing of the signal in any suitable manner (not shown).

A groove 15x, provided in the lower part of the casing, aids in guiding the signal blade or plate during its movements to and from the signalling position.

Referring to certain details of construction, the operating shafts or rods 62 and 74, as shown in Fig. 2, are desirably extended through the upper portion of the window opening 90, the glass 91 being always kept at least slightly lowered in order to provide room thereabove for said parts 62 and 74. In Fig. 2 the vehicle is shown provided with the usual visor 92 beneath which the device is sheltered.

To the inner side of the wall portion 93 of the vehicle is attached a housing or casing element 94 by means of apertured ears 95 and screws 96. Said casing element 94 is provided with the bosses, 97, 98, 99 and 100, each of which are centrally recessed and are properly positioned to retain the pointed stud 67 of the operating handle in whatever signaling position it is adjusted.

The boss 100 is not recessed in the same way as the other bosses but is provided with a hole which extends therethrough and which receives the projecting end portion 81 of the arm 80. The bosses 99 and 100 are placed close to each other. When the handle is opposite to the boss 99 the clutch 33 has been shifted to cause the signal to be projected for the purpose of indicating a left hand turn, but when the handle is shifted a little farther and brought into register with the boss 100, the crank arm 65, on account of its resiliency, will, when released, cause the pin 67 to depress the projecting part 81 of the arm 80 and thereby will shift the rod 74 into the path of the hook 75 thus causing the signal element 15 to be tilted upwardly when it is completely projected to indicate a right hand turn.

The clutch is maintained in the right hand position when the handle is opposite either the boss 99 or 100. When the handle is opposite the boss 97 the clutch is in the left hand position causing gears 31 and 39 to mesh with each other to retract the signal, and when the handle is opposite to boss 98 the clutch is in the neutral position.

It will be understood that owing to the rigid connection between the operating arm 65 and the clutch 33, whenever the clutch is restored to its neutral position by the automatic means, said crank handle will be brought to the neutral position as shown in Fig. 4.

Claims:

1. In a vehicle signal, a driving shaft operatively related to the propulsive power of the vehicle to rotate continuously while the vehicle is travelling, a casing, a signal element movable from a concealed position to an exposed position with respect to said casing and vice-versa, a screw shaft the threads of which are in engagement with a portion of said signal element to reciprocate the latter, manually controllable means to operatively connect and disconnect said driving shaft with said screw shaft, and means to automatically reverse the direction of the rotation imparted to said screw shaft by said driving shaft for the purpose of withdrawing the signal element after the same has been ejected into view from said casing.

2. In a vehicle signal, a driving shaft operatively related to the propulsive power of the vehicle to rotate continuously while the vehicle is travelling, a casing, a signal element movable from a concealed position to an exposed position with respect to said casing and vice-versa, a screw shaft the threads of which are in engagement with a portion of said signal element to reciprocate the latter, manually controllable means to operatively connect and disconnect said driving shaft with said screw shaft, and means to automatically reverse the direction of the rotation imparted to said screw shaft by said driving shaft for the purpose of withdrawing the signal element after the same has been ejected into view from said casing; said reversing means comprising a clutch which is manually operable for stationing the same in a neutral position.

3. In a vehicle signal, a casing, a signal element movably mounted within said casing to be projected therefrom into a signaling position, mechanically operative manually controllable means for ejecting said signal, the signal element proper being pivotally connected with said ejecting means and being provided with a hook in spaced relation to its pivotal mounting, and means to manually project a stop into the path of said hook to change the position of the signal element when the same is ejected.

4. In a vehicle signal, a casing, a signal element movably mounted within said casing to be projected therefrom into a signalling position, mechanically operative manually controllable means for ejecting said signal, the signal element proper being pivotally connected with said ejecting means and being provided with a shoulder in spaced relation to its pivotal mounting, and means to manually project a stop into the path of said shoulder to change the position of the signal element when the same is ejected.

5. In a vehicle signal, an elongated casing having therein an upper track and a lower track, a carriage having an upper portion operatively related to said upper track and a lower portion operatively related to said lower track, an elongated signal blade projectable from one end of said casing and having its inner end pivotally connected with said carriage, a screw shaft having a screw threaded relation with said carriage, means to rotate said shaft in one direction to move said carriage in a direction to project said signal from said casing and to rotate said shaft in the reverse direction to retract said signal, and means to control the position of said signal with relation to its pivotal mounting when the same is projected from said casing into a signaling position.

6. In a vehicle signal, in combination, an elongated casing, a signal proper mounted within said casing and movable to and from a projected signaling position, a screw shaft operatively related to said signal element to project and retract the same, said shaft extending longitudinally of said casing, a gear secured to said shaft, a second gear secured to said shaft, an idle gear mounted to mesh continually with said second gear, a counter shaft, a slidable gearing mounted upon said counter shaft to rotate therewith, and means to slide said slidable gearing in one direction from a neutral position to engage said idle gear and in the opposite direction from the neutral position to engage the first mentioned of the gears which is fixed to said screw shaft.

7. In a vehicle signal, a casing, a signal element projectable therefrom into a signaling position and retractable into said casing from said signaling position, a screw shaft to operate said signaling element, gearing operatively related to said screw shaft, and an indicating gear operatively related to said gearing, said indicating gear having numerals inscribed thereon to indicate the distance which the vehicle has travelled during the operation of the said signal element.

8. In a vehicle signal, a casing, a signal element projectable therefrom into a signaling position and retractable into said casing from said signaling position, a carriage to propel said signaling element, a screw shaft to operate said carriage, gearing operatively related to said screw shaft, a reversing gear, a movable standard upon which said reversing gear is mounted, said reversing gear being normally in engagement with a portion of said gearing to be rotated thereby, a cam element with which said carriage is provided to engage and move said standard and thereby disengage said reversing gear from said gearing, a spring tending to restore said standard and reversing from gear to the normal position, a cam element carried by said reversing gear and means operated by said cam element to reverse the direction of travel to said shaft.

In testimony whereof we hereunto affix our signatures.

JEAN J. DE VOY.
ROY V. DE VOY.